(12) United States Patent
Tomitaka et al.

(10) Patent No.: US 8,267,424 B2
(45) Date of Patent: Sep. 18, 2012

(54) AIRBAG

(75) Inventors: Akihiro Tomitaka, Kanagawa (JP); Kazumasa Misawa, Kanagawa (JP); Mitsuru Mochiduki, Aichi (JP)

(73) Assignees: Toyota Motor East Japan, Inc., Miyagi (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 12/677,786

(22) PCT Filed: Sep. 12, 2008

(86) PCT No.: PCT/JP2008/066608
§ 371 (c)(1),
(2), (4) Date: Jul. 2, 2010

(87) PCT Pub. No.: WO2009/035115
PCT Pub. Date: Mar. 19, 2009

(65) Prior Publication Data
US 2010/0264631 A1 Oct. 21, 2010

(30) Foreign Application Priority Data

Sep. 14, 2007 (JP) ................... 2007-240259
Sep. 16, 2007 (JP) ................... 2007-240305
Sep. 16, 2007 (JP) ................... 2007-240306

(51) Int. Cl.
*B60R 21/20* (2011.01)
*B60R 21/231* (2011.01)

(52) U.S. Cl. ................. 280/730.2; 280/743.1

(58) Field of Classification Search .......... 280/730.2, 280/743.1
See application file for complete search history.

(56) References Cited

U.S. PATENT DOCUMENTS

| | | | | |
|---|---|---|---|---|
| 5,172,790 A | * | 12/1992 | Ishikawa et al. | 180/268 |
| 6,996,576 B2 | * | 2/2006 | Vos et al. | 707/688 |
| 7,487,994 B2 | * | 2/2009 | Okada et al. | 280/732 |
| 7,938,440 B2 | * | 5/2011 | Kataoka et al. | 280/730.2 |
| 7,971,901 B2 | * | 7/2011 | Tomitaka et al. | 280/730.2 |
| 2004/0066022 A1 | * | 4/2004 | Mori et al. | 280/730.1 |

(Continued)

FOREIGN PATENT DOCUMENTS

JP 3-281458 A 12/1991
(Continued)

OTHER PUBLICATIONS

International Search Report (ISR) issued in PCT/JP2008/066608.
(Continued)

*Primary Examiner* — Joseph Rocca
(74) *Attorney, Agent, or Firm* — Chen Yoshimura LLP

(57) ABSTRACT

At the inflation thereof, an airbag (10) has a three-dimensional shape composed of a front face (11), a back face (12), left and right side faces (13L, 13R), a ceiling face (14), and a bottom face (15). The front face (11) and the back face (12) have a trapezoidal shape in which the upper bottom is wider than the lower bottom. The upper edge of the front face (11) is formed to be wider than the upper edge of the back face (12). At a side collision, the airbag (10) inflates between seats (20L, 20R) so that the airbag face opposed to an occupant (P) falls to the occupant side. This can allow, when the occupant (P) moves to the collision side, the shoulder of the occupant to strike the airbag while simultaneously or substantially simultaneously allowing the head to strike the airbag. An airbag can be provided that blocks, at a side collision, the move due to the impact of the side collision of the occupant in the lateral direction.

5 Claims, 14 Drawing Sheets

U.S. PATENT DOCUMENTS

2005/0104340 A1    5/2005    Hasebe et al.
2005/0167958 A1*    8/2005    Okada et al. .................. 280/732

FOREIGN PATENT DOCUMENTS

| | | |
|---|---|---|
| JP | 2000-185618 A | 7/2000 |
| JP | 2004-217109 A | 8/2004 |
| JP | 2005-067272 A | 3/2005 |
| JP | 2005-145225 A | 6/2005 |

OTHER PUBLICATIONS

Written Opinion (PCT/ISA/237) issued in PCT/JP2008/066608 (parent application). This Written Opinion considers the claims are described by or obvious.

International Preliminary Report on Patentability Chapter II (PCT/IPEA/409) issued in PCT/JP2008/066608 (parent application).

* cited by examiner

AIRBAG

TECHNICAL FIELD

The present invention relates to an airbag apparatus for protecting an occupant of an automobile. In particular, the present invention relates to an airbag that is inflated between two seats in order to restrict, at a side collision, an occupant sitting in a seat opposite to the collision from moving to the collision side.

BACKGROUND ART

As a protection device for reducing the impact to occupants in the event of a frontal collision of an automobile, an airbag apparatus has been widely known. A conventional airbag device is attached in a steering device or an instrument panel, and in the event of a frontal collision of an automobile, the airbag is inflated at the front side of a driver seat and a front passenger seat to thereby restrain occupants sitting in the driver seat and the front passenger seat from moving to the front side. As a result, the occupants in the driver seat and the front passenger seat are effectively protected at the frontal collision of the automobile.

In recent years, protecting an occupant in an automobile at a side collision of the automobile also has been considered important. Thus, so-called side airbag devices and curtain shield airbag devices have been mounted in vehicles. Specifically, as shown in FIG. 11 for example, at the front passenger seat-side of an automobile 1, a curtain shield airbag apparatus 2 is configured so as to inflate at the neighborhood of the inner side of the glass at the upper portion of a front door 1a. A side airbag apparatus 3 is configured so as to inflate at the neighborhood of the inner side of the lower portion of the front door 1a. In FIG. 11, although the curtain shield airbag device 2 and the side airbag device 3 are shown only at the front passenger seat-side, the curtain shield airbag device 2 and the side airbag device 3 are also provided at the driver seat-side in an actual case.

As shown by the arrow X in FIG. 11, when the automobile 1 is collided at a side thereof with another vehicle 4, the curtain shield airbag device 2 and the side airbag device 3 are respectively inflated at a position close to the inner sides of the front door 1a, i.e., an outer region of the front passenger seat, to thereby protect the body of the occupant of the front passenger seat from having a direct contact with the front door 1a.

On the other hand, Patent Publication 1 discloses an airbag apparatus that is attached in the ceiling of the vehicle interior and that is designed to inflate downwardly to the front side of the occupant in the event of a frontal collision of an automobile. Patent Publication 2 discloses an airbag apparatus that is provided in a console between a driver's seat and a front passenger seat and that is designed to inflate, at the side collision of the automobile for example, between the seat back of the driver's seat and the seat back of the front passenger seat.

Patent Publication 3 discloses, for example, an airbag apparatus that is attached in an instrument panel in front of the front passenger seat and that is designed so that the airbag body is inflated at the front side of the occupant of the front passenger seat at the frontal collision of the automobile, a panel member provided in the vicinity of the ceiling is rotated in the lower direction, and a part of the airbag body inflated to a cabin of the vehicle is restricted from being moved to the rear side in the vicinity of the ceiling.

Patent Publication 4 discloses, for example, an airbag apparatus that is attached in the instrument panel in front of the front passenger seat, that is designed so that the main airbag body divided to left and right portions is caused, at the frontal collision of the automobile, to inflate in front of the occupant of the front passenger seat and the ceiling airbag body provided in the vicinity of the ceiling of the front passenger seat is caused to inflate in the lower direction and is engaged with a space between the divided left and right portions of the main airbag body inflated to the inner side of the vehicle interior to restrict the dislocation of the main airbag in the lateral direction to thereby prevent the main airbag from inflating in an unexpected direction.

Patent Publication 1: JP2000-185618A
Patent Publication 2: JP2004-217109A
Patent Publication 3: JP2005-067272A
Patent Publication 4: JP2005-145225A

DISCLOSURE OF THE INVENTION

Problem to be Solved by the Invention

However, in the curtain shield airbag apparatus 2 and the side airbag apparatus 3 shown in FIG. 11, in the event of a side collision, an occupant at the opposite side of the side collision, i.e., an occupant at the driver's seat-side in FIG. 11, may be moved as shown by the arrow A by inertia to the collision side.

In the airbag apparatus according to Patent Publication 1, at a frontal collision, the airbag is inflated from the ceiling to the front side of an occupant in the rear seat in order to protect the occupant. However, this airbag apparatus is not configured so as to restrict, at a side collision, an occupant from moving to the collision side.

In the airbag apparatus in Patent Publication 2, at a side collision for example, the airbag is allowed to inflate between the seat back of the driver's seat and the seat back of the front passenger seat to disperse the load applied from the side collision to the driver's seat or the front passenger seat via the seat back to the seat back of the front passenger seat or the seat back of the driver's seat while transmitting the load to thereby suppress the driver's seat or the front passenger seat from falling to the opposite side of the side collision. Therefore, the airbag apparatus of Patent Publication 2 is not configured so as to restrict, at a side collision, the occupant from moving to the collision side.

Furthermore, the airbag apparatuses according to Patent Publication 3 and Patent Publication 4 also have an objective of protecting an occupant at a frontal collision and are not configured so as to restrict, at a side collision, an occupant from moving to the collision side.

The present invention has been made in view of the above points. It is an objective of the invention to provide an airbag that suppresses, at a side collision, an occupant from moving due to the impact of the side collision in the lateral direction.

Means for Solving the Problem

In order to achieve the objective, the first configuration of the present invention is: an airbag that is inflated between two seats arranged in a vehicle width direction. In an inflated status, an outline of a vertical cross section along a vehicle width direction has a shape in which an upper bottom is wider than a lower bottom.

In order to achieve the above objective, the second configuration of the present invention is an airbag that forms, at the inflation thereof, a three-dimensional shape composed of a front face, a back face, left and right side faces, a ceiling face, and a bottom face. The front face and the back face form a shape in which an upper bottom is wider than a lower bottom.

In the airbag of the present invention, the front face preferably has an upper edge wider than the upper edge of the back face.

The airbag may be structured so that, in an inflated status, a length in a vehicle width direction at a position corresponding to a head may be longer than a length in a vehicle width direction at a position corresponding to a shoulder. A part of the airbag in an inflated status is desirably positioned at a position corresponding to a low back. In a horizontal cross section at a position corresponding to a torso, the front cloth portion may have a length in the vehicle width direction that is longer than the length of the rear cloth portion in the vehicle width direction.

The airbag desirably can be deployed from an upper portion of a center console. The airbag in an inflated status is desirably structured so that an upper portion is abutted to a vehicle interior ceiling and a lower portion is abutted to a center console.

Effect of the Invention

According to the present invention, when an airbag is allowed at a side collision to inflate between seats and an occupant moves to the collision side, the shoulder of the occupant can strike the airbag while simultaneously or substantially simultaneously allowing the head to strike the airbag to thereby block an excessive move of the occupant, thereby securely protecting the shoulder, the head, and the neck of the occupant.

DESCRIPTION OF THE REFERENCE NUMERALS

Figure 1:
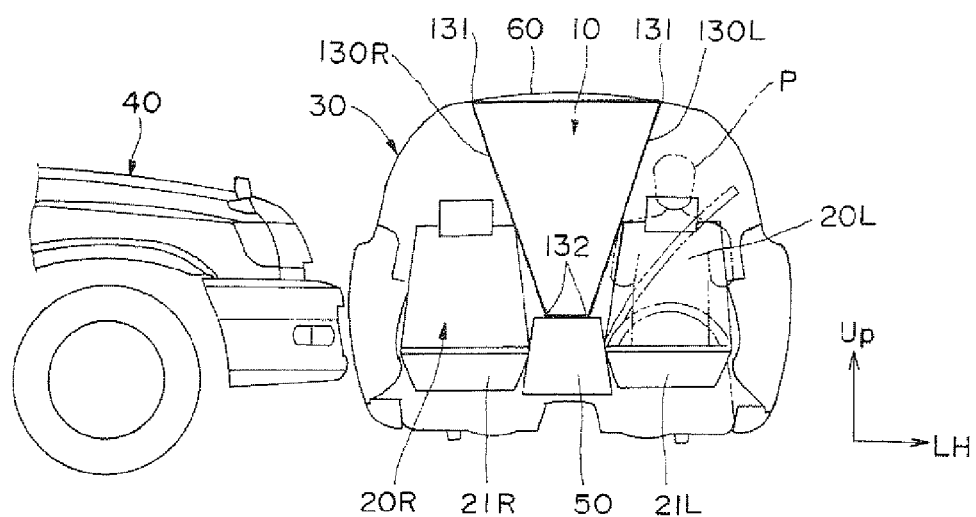
FIG. 1 is a front view illustrating the inflated status of the airbag according to the first embodiment of the present invention seen from the front side of the vehicle.

1 Automobile
1a Front door
2 Curtain shied airbag apparatus
3 Side airbag apparatus
4 Another vehicle
10, 10A, and 10B Airbag
11 Airbag front face
12 Airbag back face
13L and 13R Airbag side face
14 Airbag ceiling face
15 Airbag bottom face
20L and 20R Seat
21L and 21R Seat cushion
25 Seat back
30 and 40 Vehicle
110 Airbag apparatus
111 Airbag
120 Vehicle
121 Center console
122L and 122R Seat
110 Airbag front cloth portion
120 Airbag rear cloth portion
130L and 130R Airbag side cloth portion
131 Airbag upper edge
132 Airbag lower edge
140 Airbag ceiling cloth portion
150 Airbag bottom cloth portion
151 First side of bottom cloth portion
152 Second side of bottom cloth portion
210L and 210R Airbag apparatus
211L and 211R Airbag
212L and 212R Airbag storage means
213V Center console vertical portion
213H Center console horizontal portion diversion
220 Vehicle
221 Center console
222L and 222R Seat
223L and 223R Seat back
224V Console vertical portion
224H Console horizontal portion
310 Airbag apparatus
311 Airbag
312 Airbag storage means
320 Vehicle
321 Center console
321B Center console base portion
321H Center console armrest
321V Center console vertical portion
322L and 322R Seat
323L and 323R Seat cushion
324 Footrest space
325L and 325R Seat back
326 Vehicle interior ceiling
F1 and F2 Airbag front face
U1 and U2 Airbag upper face
D Airbag bottom face
B Airbag back face P1 and P2 Occupant
P101 and P102 Occupant

BEST MODE FOR CARRYING OUT THE INVENTION

The following section will describe the present invention in detail based on some embodiments shown in the drawings. In the drawings, Fr represents the vehicle front side, Up represents the vehicle upper side, and LH represents the left side in the vehicle width direction.

First Embodiment

FIG. 1 illustrates the usage status of an airbag apparatus 10 according to the first embodiment of the present invention. The airbag 10 is inflated between two seats 20L and 20R when a vehicle 30 in which two seats 20L and 20R are arranged in the vehicle width direction is collided at a side with another vehicle 40. When no collision occurs, the airbag 10 is in a folded status and is provided in a partition member such as a console that is raised from the floor and that is provided between the seat backs of the two seats 20L and 20R. An inflator for jetting gas into this folded airbag is also provided in the partition member. At a side collision, the impact is detected by a sensor attached to the vehicle body. The detection triggers the inflator to jet gas to cause the airbag 10 to inflate.

The airbag apparatus is supported by a vehicle body constituting member such as a reinforcement member (not shown) provided at the back side of a panel 18. The airbag apparatus is configured so that the airbag 10 and the inflator 16 are included in a case (housing) 17.

The airbag 10 is configured to have a bag-like shape having a gas inflow opening and is formed by stitching a fabric cloth made of a polyester yarn or a polyamide yarn. The inflator 16 has a gas discharge outlet through which the gas for inflating the airbag 10 is discharged.

The panel 18 is formed by providing two rectangular airbag doors 18a and 18b so as to be adjacent to each other so that both of the airbag doors 18a and 18b can be opened at the boundary therebetween.

Figure 2:
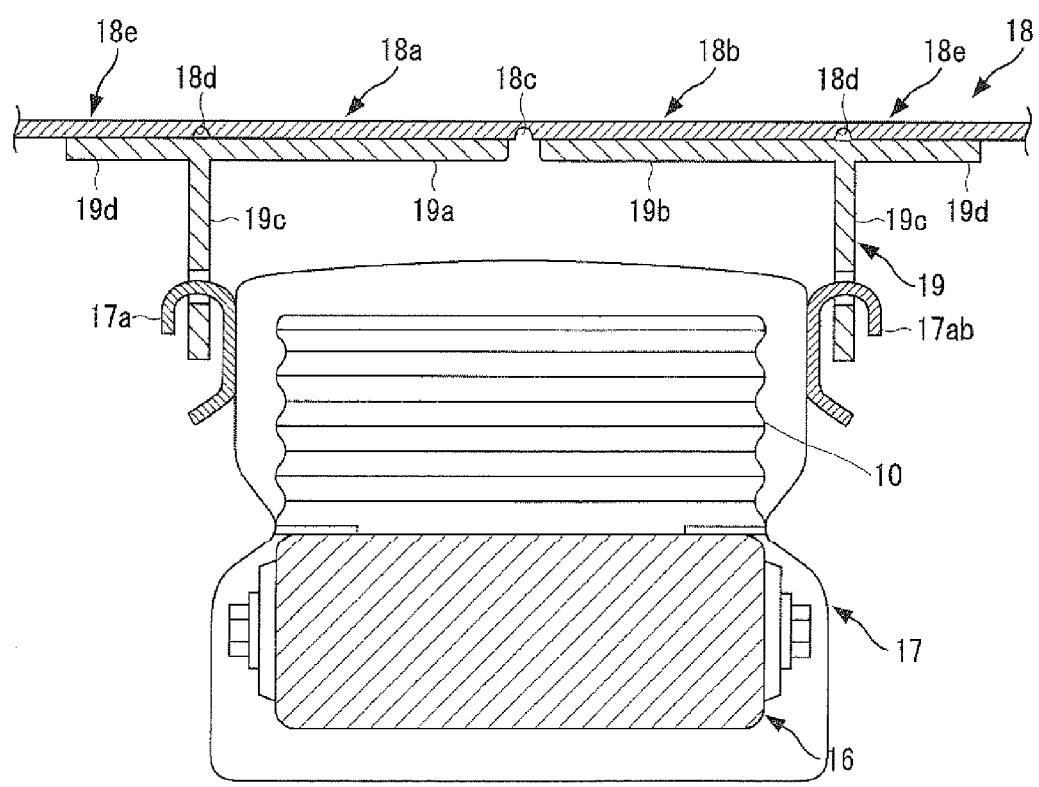
FIG. 2 is a schematic cross-sectional view illustrating the stored status of the airbag of FIG. 1.

As shown in FIG. 2, the panel 18 has a dotted line or straight line-like cut that is formed along the boundary of the two airbag doors 18a and 18b and the outline thereof. The cut at the boundary of the two airbag doors 18a and 18b is denoted with the reference numeral 18c and the cut along the outline is denoted with the reference numeral 18d. These cuts 18c and 18d are formed along the vehicle front-and-rear direction and over the entire length of the airbag doors 18a and 18b.

The panel 18 is configured as a synthetic resin-made panel base member that is formed by polypropylene (PP) for example to have a predetermined shape. The panel 18 may be configured by adhering covering material over the outer surface of this panel base member.

The airbag doors 18a and 18b and the peripheral 18e formed at predetermined positions of the panel 18 are supported by a retainer 19 that is locked to the airbag apparatus provided at the back side of the panel.

The retainer 19 is connected to the airbag apparatus so that the shattering of the airbag doors 18a and 18b for example may be prevented during the airbag deployment. As shown in FIG. 2, this retainer 19 includes: door support portions 19a and 19b; a side plate portions 19c formed from the base ends of the door support portions 19a and 19b to the inner side of the vehicle interior member to have a substantially plate frame-like shape so as to surround the four corners of the airbag apparatus; and a peripheral support portion 19d.

The door support portions 19a and 19b support the airbag doors 18a and 18b and are fixed to the airbag doors 18a and 18b in order to prevent the shattering of the airbag doors 18a and 18b when the doors are opened. As shown in FIG. 2, the door support portions 19a and 19b are separated at a region along the cut 18c at the boundary of the two airbag doors 18a and 18b. Thus, the two door support portions 19a and 19b, and 131 are fixed to the back face of the panel 10 so as to support the respective airbag doors 18a and 18b.

The side plate portion 19c is a plate-like panel member raised from the base end of each of the door support portions 19a and 19b adhered to the back face of each of the airbag doors 18a and 18b to the airbag apparatus at the back side of the panel 18. As shown in FIG. 2, the tip end of this side plate portion 19c is locked to each of the hooks 17a and 17b of the airbag apparatus for example. This side plate portion 19c also has a function to guide a direction along which an airbag (not shown) is deployed at the inflation thereof.

The peripheral support portion 19d supports the panel 18 at the periphery of the airbag door and is fixed so as to be adhered to the back face of the panel of the periphery.

The retainer 30 is integrally formed by resin molding. This resin material may be olefin-base thermoplastic elastomer (Thermo Plastic Olefin, so-called TPO) but also may be other materials. The retainer 19 is not limited to resin material and may be material such as steel.

Figure 3:
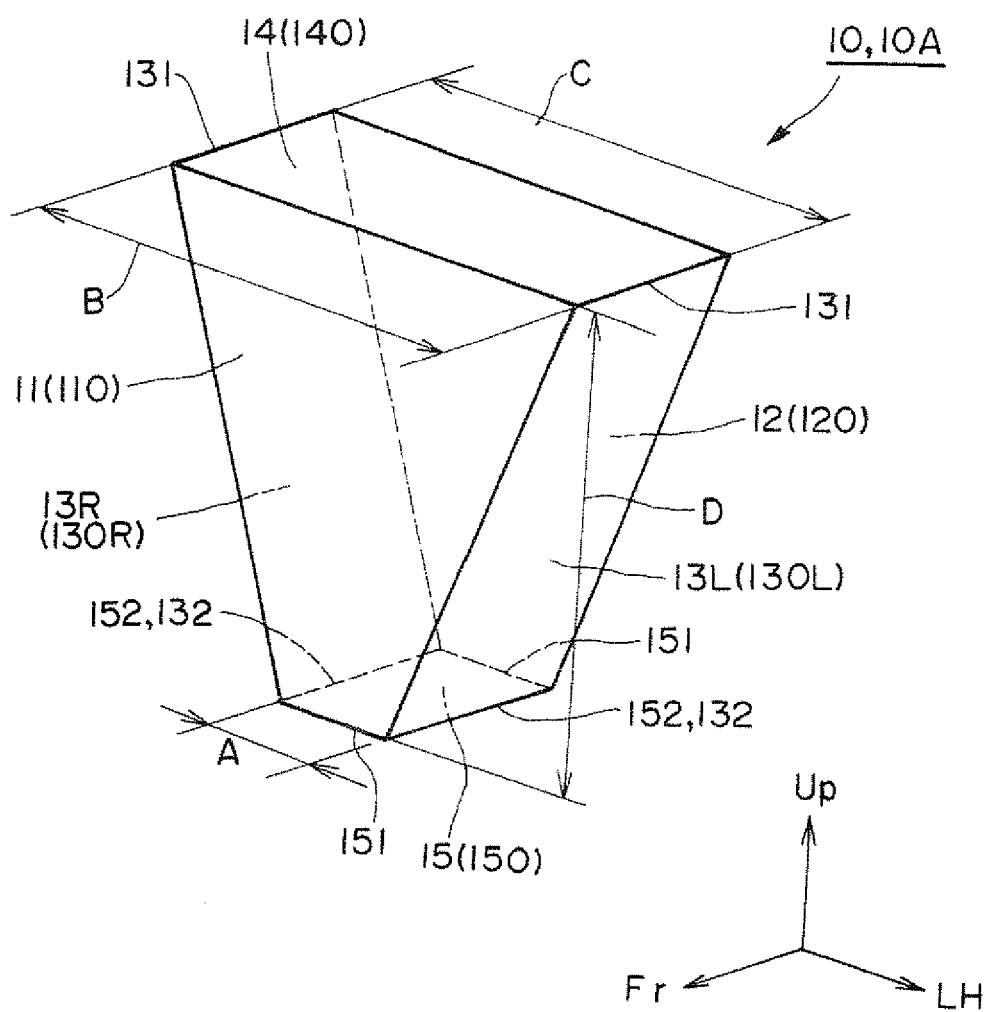
FIG. 3 is a perspective view illustrating the airbag of FIG. 1.

Next, the following section will describe the shape of the airbag 10 when the airbag 10 is inflated at the highest level (hereinafter referred to as "at inflation"). FIG. 3 is a perspective view illustrating the airbag 10 at the inflation thereof. The airbag 10 forms, at the inflation thereof, a hexahedron composed of a front face 11, a back face 12, left and right side faces 13L and 13R, a ceiling face 14, and a bottom face 15.

In order to form the three-dimensional shape shown in FIG. 3 at the inflation thereof, the airbag 10 is composed of, for example, a front cloth portion 110 forming the front face 11, a rear cloth portion 120 forming the back face 12, left and right side cloth portions 130L and 130R forming the left and right side faces 13L and 13R, a ceiling cloth portion 140 forming the ceiling face 14, and a bottom cloth portion 150 constituting the bottom face 15.

In particular, the bottom cloth portion 150 is formed to have a substantially-rectangular outer shape composed of a pair of parallel first sides 151 and 151 and second sides 152 and 152 that are orthogonal to the first sides 151 and 151 and that are parallel to each other and is horizontally inflated at the inflation of the airbag. The front cloth portion 110 extends, at the inflation of the airbag, from one of the first sides, i.e., the first side 151 at the vehicle front side, to the upper side to have a plane extended to the vehicle front side. The front cloth portion 110 is formed to have a substantially-trapezoidal shape in which the bottom surface is wider than the bottom surface. Specifically, the width A at the lower end of the airbag front face is narrower than the width B of the upper edge. The rear cloth portion 120 is formed, at the inflation of the airbag, to extend from the other of the first sides, i.e., the first side 151 at the vehicle rear side, to the upper side to have a plane extended to the vehicle rear side. As in the front cloth portion 110, the rear cloth portion 120 is also formed to have a trapezoidal shape in which the upper surface is wider than the bottom surface. The left and right side cloth portions 130L and 130R extend from the respective second sides 152 and 152 to the upper side and each of the side cloth portions 130L and 130R is structured so that one side edge is attached to the side edge of the front cloth portion and the other side edge is attached to the side edge of the rear cloth portion. The ceiling cloth portion 140 is formed to have a rectangular shape whose four sides are attached to the upper edge of the front cloth portion 110, the upper edge of the rear cloth portion 120, and the respective upper edges of the left and right side cloth portions 130L and 130R. The bottom cloth portion 150, the front cloth portion 110, the rear cloth portion 120, the left and right side cloth portions 130L and 130R, and the ceiling cloth portion 140 are formed by cutting a flexible fabric sheet for example. The airbag 10 is configured by stitching these edges one another.

In order to introduce the gas from the inflator into the airbag 10 as described above, a gas suction inlet is provided in the rear cloth portion 120 for example.

As shown in FIG. 1, at a side collision, the airbag 10 according to this embodiment is used so that the neighboring two seats 20L and 20R have therebetween the bottom cloth portion 150 at the lower side and has the ceiling cloth portion 140, at the upper side of this bottom cloth portion 150, that is wider than the bottom cloth portion 150 in the vehicle width direction. According to the usage as described above, in the inflated status shown in FIG. 1, the bottom cloth portion 150 is expanded at the upper face of a console 50 provided between the two seat cushions 21L and 21R and the left and right side cloth portions 130L and 130R are expanded so that the upper edge 131 is at the outer side in the vehicle width direction than the lower edge 132. During this, as shown in FIG. 1, at a position corresponding to the head, i.e., at a position at the height of the head of the occupant P, the airbag 10 has a length in the vehicle width direction that is longer than a length in the vehicle width direction at a position corresponding to the shoulder, i.e., at a position at the height of the shoulder of the occupant P. Furthermore, a portion of the inflated airbag 10 is positioned at the position corresponding to the low back.

Thus, when a side collision occurs, for an occupant sitting in a seat at the opposite side of the collision (in the shown example, the occupant P sitting in the left seat 20L), the left side cloth portion 130L is expanded at the right side of the occupant P. In particular, the left side cloth portion 130L is inflated while being inclined so as to fall to the left side of the vehicle. This can effectively restrict the move of the occupant P due to the impact at the collision to the collision side, i.e., to the right side of the vehicle. In particular, while simultaneously or substantially simultaneously allowing the shoulder of the occupant P to strike the left side cloth portion 130L, the head can be allowed to strike the left side cloth portion 130L, thus protecting the shoulder, head, and neck of the occupant P.

Second Embodiment

An airbag 10A according to the second embodiment of the present invention has the same configuration as that of the airbag 10 according to the first embodiment except for the size thereof. Specifically, the upper edge of the front cloth portion 110 is formed to have a wider width than that of the upper edge of the rear cloth portion 120. Specifically, the upper edge of the front cloth portion 110 has the width B wider than the width C of the upper edge of the rear cloth portion 120.

Figure 4:
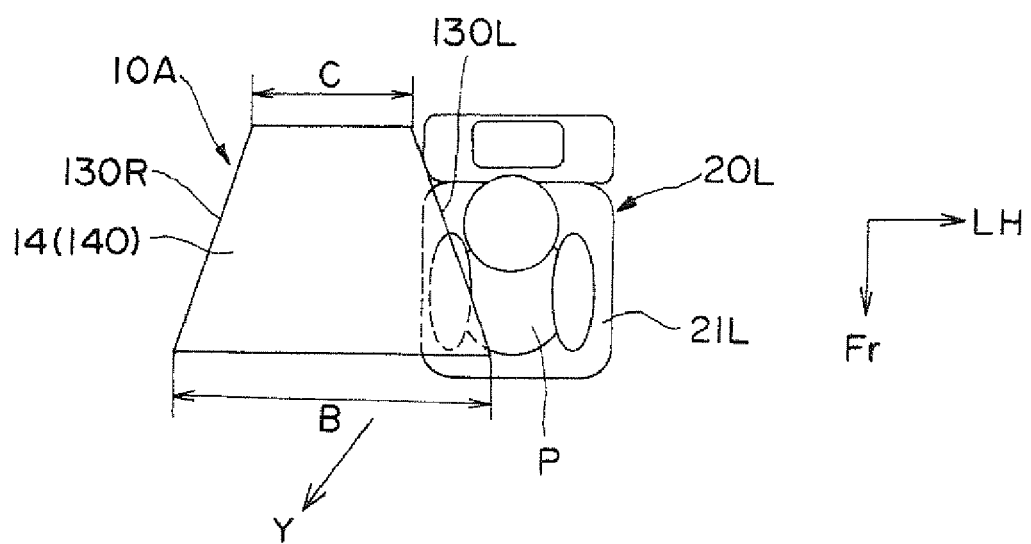
FIG. 4 is a top view illustrating the inflated status of the airbag according to the second embodiment of the present invention.

FIG. 4 is a top view illustrating the airbag 10A inflated at the right side of the occupant P sitting in the left seat 20L. The airbag 10A according to this embodiment is structured so that the front cloth portion 110 is wider than the rear cloth portion 120 at least in the horizontal cross section at a position corresponding to a torso. According to the airbag 10A as described above, the left and right side cloth portions 130L and 130R have the vehicle front portion that is wider than the vehicle rear portion in the vehicle width outer direction. Thus, as shown in FIG. 4, the left side cloth portion 130L covers the right front side of the occupant P of the left seat 20L.

According to the airbag 10A as described above, as shown in FIG. 4, at a side collision, the occupant P sitting in the seat opposite to the collision side, i.e., the occupant P sitting in the left seat 20L in the shown example, can be restricted from moving to the oblique vehicle front side of the collision side (direction shown by the arrow X in FIG. 4). According to the investigation of actual accidents, there are many cases where, at a side collision, the occupant sitting in the collision opposite side-seat is moved to the oblique vehicle front side. Thus, the airbag 10A of this embodiment is effective to protect the occupant in the accident cases as described above. Regarding the occupant sitting at the right side, an identical action is given to the occupant in a symmetric manner in the left-and-right direction.

Although various modification examples of this embodiment may be considered, the vertical cross-sectional shape at the inflation of the airbag in the vehicle width direction, i.e., the outline, may have a trapezoidal shape or a reverse triangular shape in which the upper surface is wider than the bottom surface and the airbag side face at the inflation thereof may be inclined with an inclination falling to the outer side of the vehicle. When the airbag is formed to have a reverse triangular cross section, no bottom face is provided in the airbags 10 and 10A and the front cloth portion and the rear cloth portion are formed to have a reverse triangular shape and the lower edges of the left and right side cloth portions are stitched for example.

Figure 5:
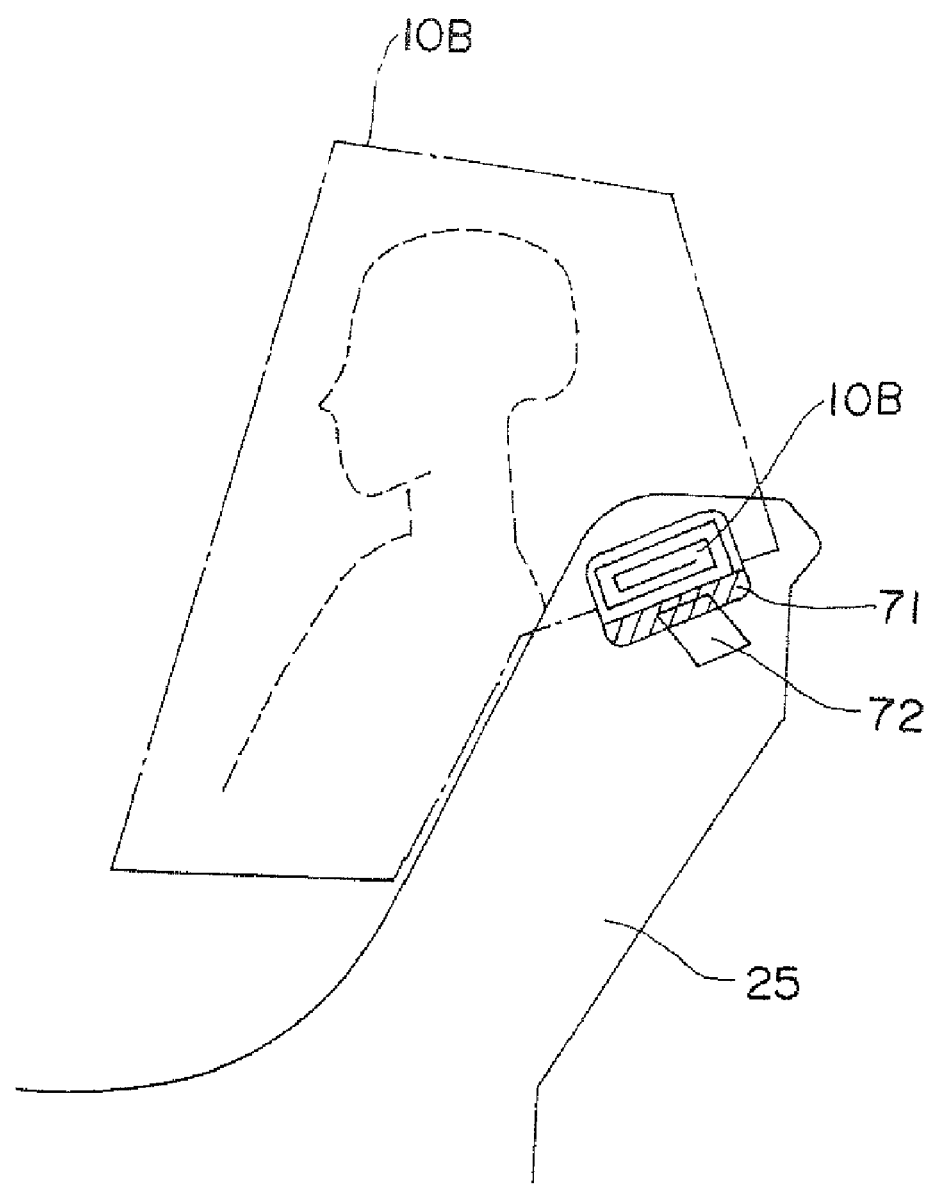
FIG. 5 illustrates the airbag according to another embodiment of the present invention.

For example, when the seat backs of the left and right rear seats are configured in an integrated manner and when the upper portion at the vehicle width center of the seat back has, as shown in FIG. 5, a case 71 accommodating a folded airbag 10B that is attached via a bracket 72 to the vehicle body, the airbag 10B is configured, at the inflation thereof as shown by the alternate long and short dash line, so that a portion of the back face is inflated along the surface of the seat back 25. In this case, as shown in FIG. 5, the airbag 10B shows a hexagonal outer shape when being seen from the side.

Third Embodiment

Figure 6:
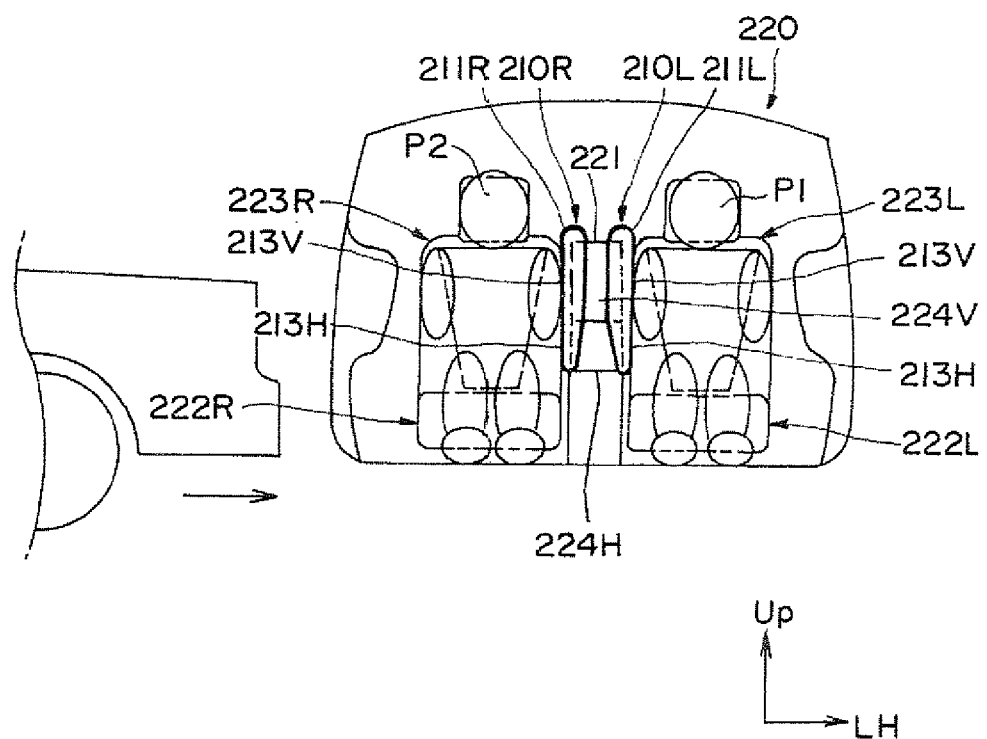
FIG. 6 is a front view illustrating the usage status of the airbag apparatus according to the third embodiment of the present invention seen from the vehicle front side.

FIG. 6 shows the usage status of airbag apparatuses 210L and 210R according to an embodiment of the present invention seen from the front side of a vehicle 220. Airbags 211L and 211R of the airbag apparatuses 210L and 210R inflate, when the vehicle 220 including two seats 222L and 222R arranged in the vehicle width direction via the center console 221 has a side collision with another vehicle, between the left and right seats 222L and 222R and the center console 221, respectively.

When there is no side collision, the two left and right airbags 211L and 211R are, in a folded status respectively, stored in cases 212L and 212R provided at a side portion of the center console 221-side of seat backs 223L and 223R of the respective left and right seats 222L and 222R for example. The inflators for jetting the gas to be supplied to these folded airbags 211L and 211R are also provided in the respective seat backs 223L and 223R. At a side collision, the impact is detected by a sensor attached to the vehicle body. This detection triggers the inflators to jet gas to thereby allow the respective airbags 211L and 211R to inflate.

By the way, a configuration of an airbag apparatus 110 may be considered where, when the automobile as shown in FIG.

Figure 13:
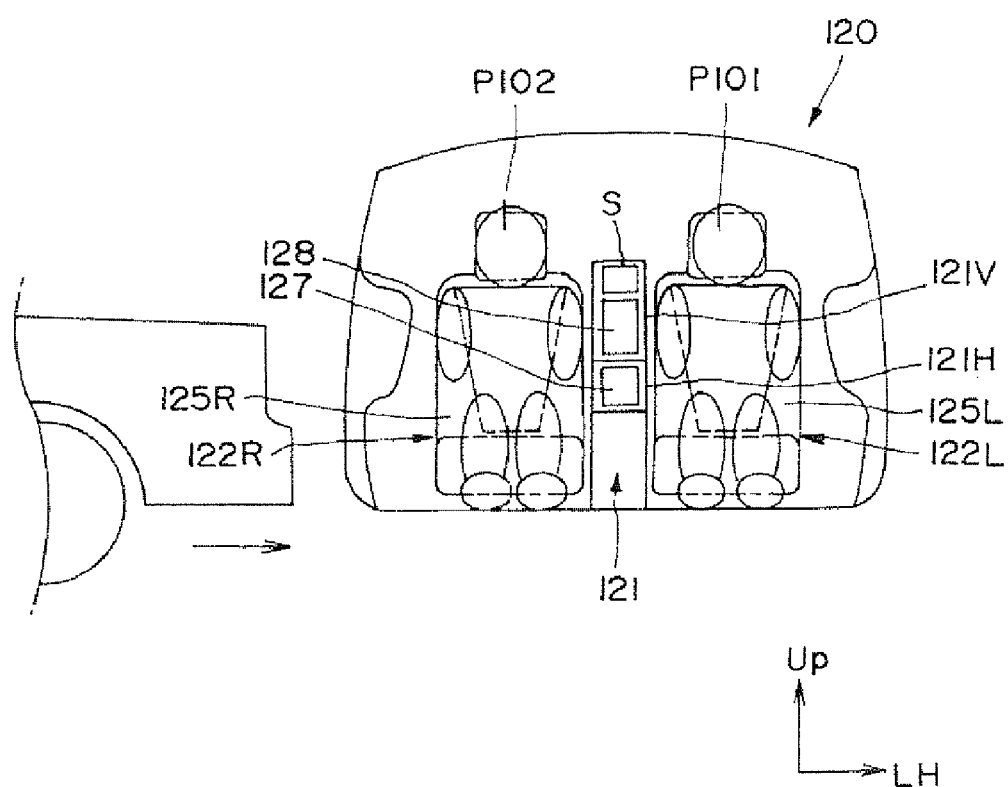
FIG. 13 is a schematic view illustrating the configuration of a conventional center console provided between two seats arranged in a vehicle width direction seen from the vehicle front side.

12 and FIG. 13 for example in which two seats 122L and 122R arranged in the lateral direction have therebetween a center console 121 is subjected to a side collision, an airbag 111 is caused to inflate from the center console 121 between these two seats 122L and 122R so as to cover the center console 121 for the purpose of reducing the injury value due to the collision with the center console 121 of occupants P101 and P102 at the side collision for example.

In the case of the airbag 111 having a shape that covers the to-be-protected region as described above, the airbag 111 itself has a large size to cause a proportionally-increased inflator volume. This is disadvantageous in that storage volume in which the airbag 111 is mounted is increased and the airbag apparatus 110 is attached to the vehicle 120 with a reduced degree of freedom. Furthermore, a region not requiring the airbag effect is unnecessarily covered as a region in which the airbag 111 is inflated. This causes a large unnecessary part for the protection of the occupants P101 and P102 from the center console 121.

Figure 14:
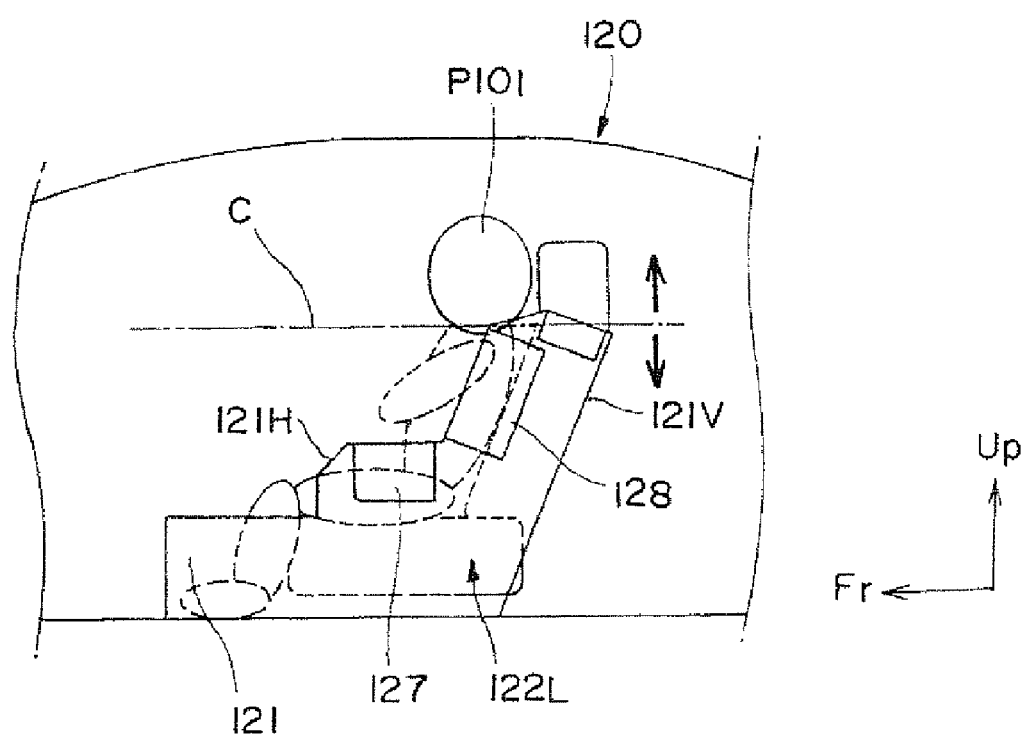
FIG. 14 is a partial perspective side view illustrating the configuration of the center console of FIG. 13.

Furthermore, in the case of the center console 121 shown in FIG. 13 and FIG. 14, in the region in FIG. 14 that corresponds to the height equal to or higher than the shoulder of the seat back 125L/125R shown by the alternate long and short dash line C, an inconvenience is caused for the occupants P101 and P102 to take a small articles for example. Thus, it is difficult to use this region for the storage of small articles. Thus, the upper end of the center console 121 at a position corresponding to the height equal to or higher than the shoulder of the seat backs 125L and 125R rarely has the storage means of small articles, thus causing the existence of a dead space S. This embodiment solves the disadvantage as described above.

Figure 7:
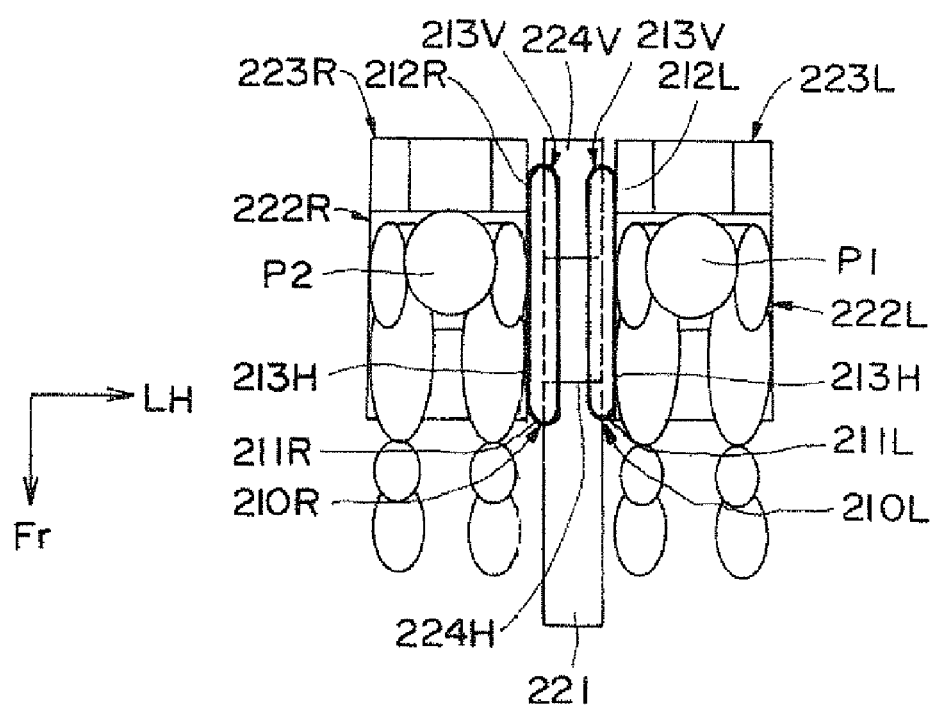
FIG. 7 is a top view of FIG. 6.
Figure 8:
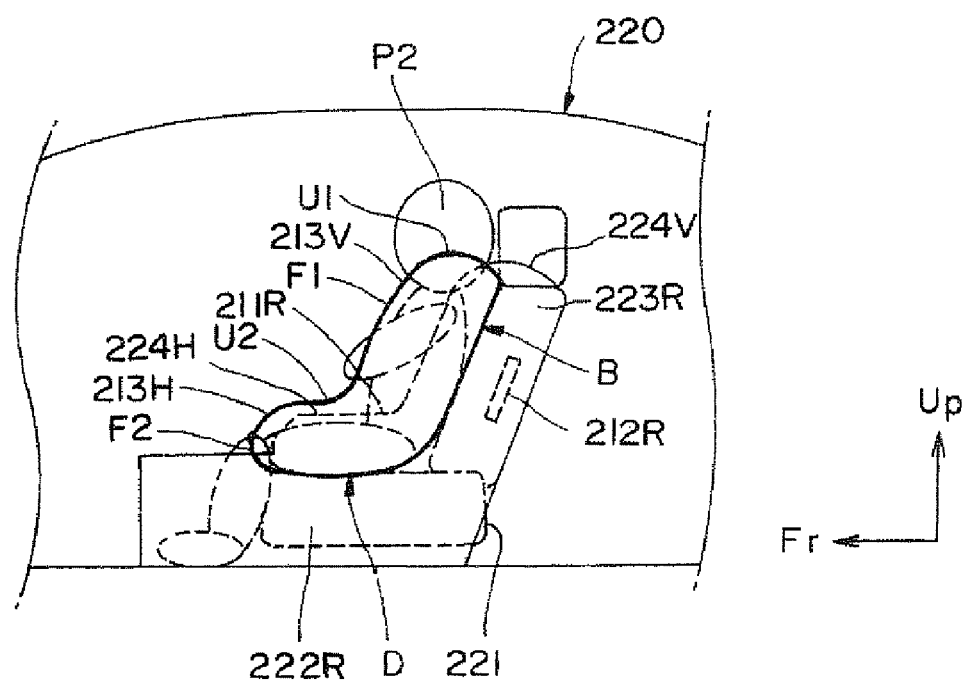
FIG. 8 is a partial perspective view illustrating the left airbag in FIG. 6 seen from the right side.

The following section will describe the shapes of airbags 211L and 211R when airbags 211L and 211R are inflated at the highest level (hereinafter referred to as "at inflation"). As shown in FIG. 6 to FIG. 8, the airbags 211L and 211R have, at the inflation thereof, a substantially-octahedron three-dimensional shape having a vertical outer cross-sectional shape of a substantially L-like shape in the vehicle front-and-rear direction. Here, FIG. 7 is a top view of FIG. 6. FIG. 8 is a partial perspective view illustrating the left airbag 211R in FIG. 6 seen from the vehicle left side.

In order to have the three-dimensional shapes shown in FIG. 6 to FIG. 8 at the inflation thereof, the airbags 211L and 211R are composed of, for example, a series of upper front cloth portions forming front faces F1 and F2 forming substantially two stages and upper faces U1 and U2 forming substantially two stages, a bottom cloth portion forming a bottom face D, a rear cloth portion forming a back face B, and left and right side cloth portions forming left and right side faces.

These upper front cloth portions, bottom cloth portion, rear cloth portion, and left and right side cloth portions are formed by, for example, cutting a flexible cloth sheet to have an appropriate shape to stitch the corresponding edges thereof. Then, the airbags 211L and 211R are configured to be a substantially three-dimensional, L-like and bag-like shape by a vertical portion 213V and a horizontal portion 213H. The vertical portion 213V is configured to extend in the upward direction in the vehicle height direction along a vertical portion 224V of a center console 221 so as to cover the vertical portion 224V. The horizontal portion 213H is configured so as to extend from the lower end position of this vertical portion 213V as a base end to extend in the frontward direction in the vehicle front-and-rear direction along a horizontal portion 224H of the center console 221 so as to cover the horizontal portion 224H.

A gas suction inlet (not shown) through which the gas from the inflator is introduced to the airbags 211L and 211R as described above is provided, for example, at the rear side of seat backs 223L and 223R of the airbags 211L and 211R.

When the airbags 211L and 211R according to this embodiment are caused to inflate at a side collision as shown in FIG. 6, the vertical portions 213V and 213V of the airbags 211L and 211R are firstly inflated between the center console 221 and the two seats 222L and 222R arranged in a vehicle width direction, respectively, from airbag storage means 212L and 212R formed at the center console 221-side of the seat backs 223L and 223R of the respective seats 222L and 222R. Next, the horizontal portions 213H and 213H are inflated along the L-like shape of the center console 221 having the substantially L-like vertical cross-sectional outline in the vehicle front-and-rear direction to cover the center console 221.

According to this configuration, the airbags 211L and 211R can be set to have the shape and size from which unnecessary parts are omitted and can be folded in a very compact manner. Thus, the inflator volume for example also can be reduced. Thus, the airbag apparatuses 210L and 210R have an improved degree of freedom for the installation. For example, the airbag apparatuses 210L and 210R also can be attached in the respective left and right seats 222L and 222R as in the airbag apparatuses 210L and 210R of this embodiment. Furthermore, regardless of the compact size, the airbags can effectively restrict, at a side collision, the occupants P1 and P2 from moving to the collision side. This can consequently reduce the injury value of the head and shoulder for example from the vertical portion 224V of the center console 221. This also can reduce the injury value of the arm and elbow for example from the horizontal portion 224H of the center console 221.

As a modification example of this embodiment, a configuration also may be used, for example, in which the airbags 211L and 211R are integrated as a single airbag and this airbag is caused to inflate along the L-like shape of the center console 221 so as to cover this center console 221.

Fourth Embodiment

Figure 9:
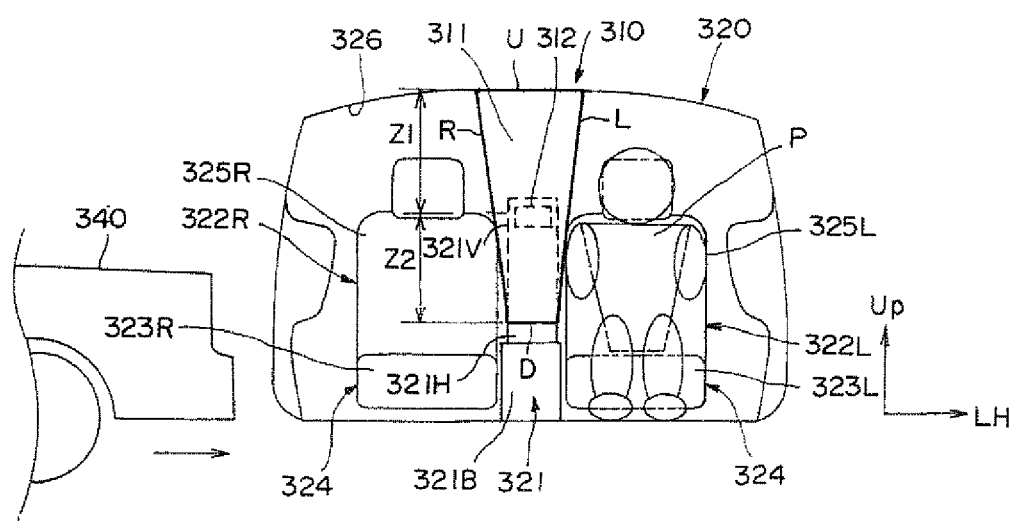
FIG. 9 is a partial perspective view illustrating the usage status of the airbag apparatus according to the fourth embodiment of the present invention seen from the vehicle front side.

FIG. 9 is a front view illustrating the usage status of an airbag apparatus 310 according to the fourth embodiment seen from the front side of a vehicle 320. An airbag 311 of the airbag apparatus 310 is designed to inflate between left and right seats 322L and 322R when the vehicle 320 having the two seats 322L and 322R via a center console 321 in the vehicle width direction is collided at a side collision with another vehicle 340.

When there is no side collision, the airbag 311 is, in a folded status, stored by being attached to an airbag storage means 312 formed at the upper end of the center console 321. An inflator for jetting gas to be supplied to the interior of this folded airbag 311 is provided in the airbag storage means 312. At a side collision, the impact is detected by the sensor attached to the vehicle body and the detection triggers the inflator to jet gas to thereby allow the airbag 311 to inflate.

The center console 321 of this embodiment is provided between the left and right seats 322L and 322R. The center console 321 is configured to include: a base portion 321B substantially horizontally extending from the rear end positions of the seat cushions 323L and 323R of the seats 322L and 322R to a footrest space 324 at the front side of the seat cushions 323L and 323R; an armrest 321H that is formed at the upper portion of this base portion 321B and that substantially horizontally extends from the base ends of the seat backs 325L and 325R to the substantial front ends of the seat cushions 323L and 323R; and a vertical portion 321V that extends from the rear end of this armrest 321H to slightly above the upper ends of the seat backs 325L and 325R in the upward direction of the vehicle height direction while slightly being inclined to the rear side.

The armrest 321H includes a storage of small articles (not shown) that is provided at the upper face thereof to have a concave shape. The middle portion of the vertical portion 321V has a storage of small articles (not shown) that is provided at the front face thereof to have a concave shape. In the vicinity of the upper end of the center console 321 at positions corresponding to the shoulders of the seat backs 325L and 325R, an airbag storage means 312 is provided to store the inflatably-folded airbag 311.

Figure 10:
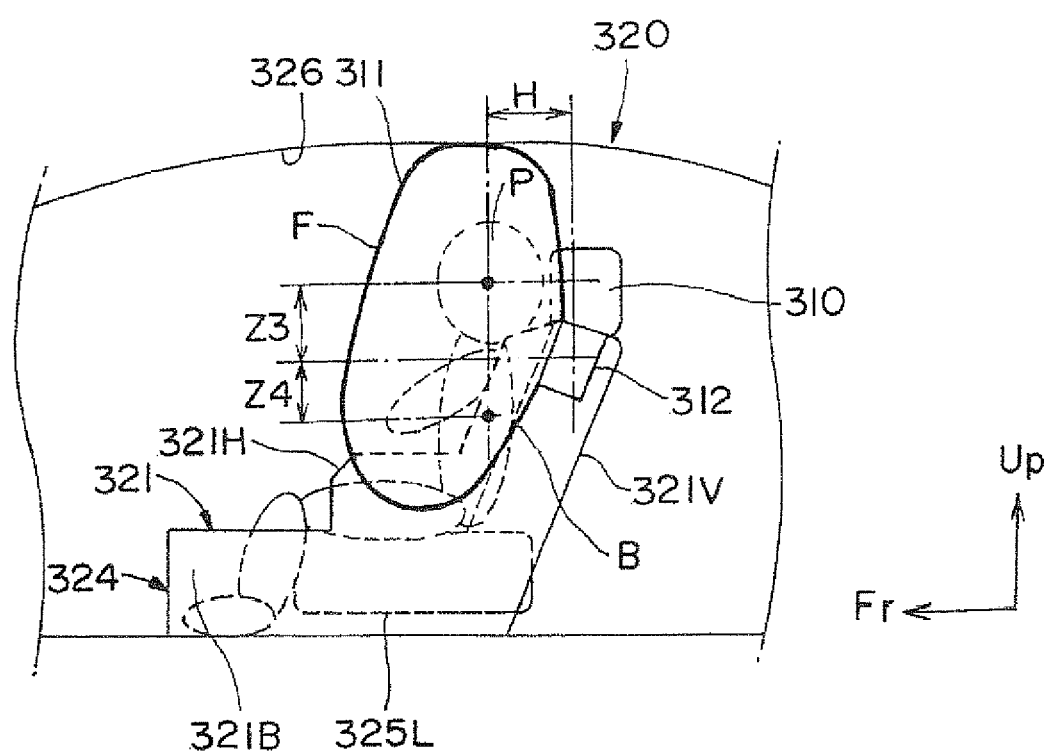
FIG. 10 is a partial perspective view illustrating the airbag in FIG. 9 seen from the right side.
Figure 11:
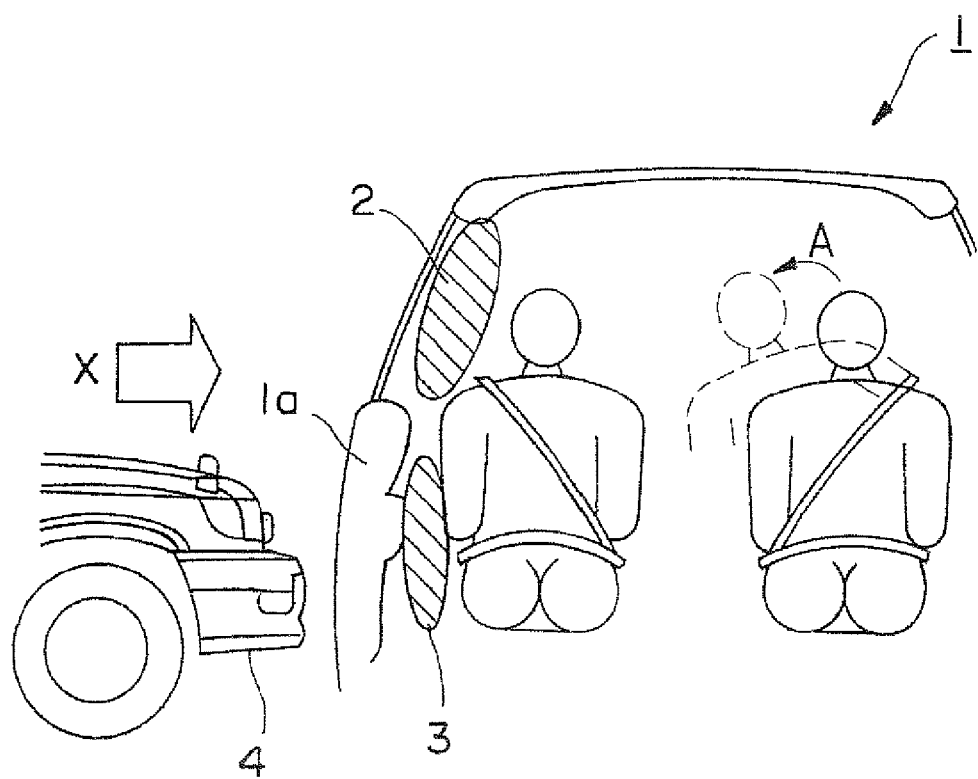
FIG. 11 is a schematic back view illustrating the configuration of an example of a conventional airbag apparatus.
Figure 12:
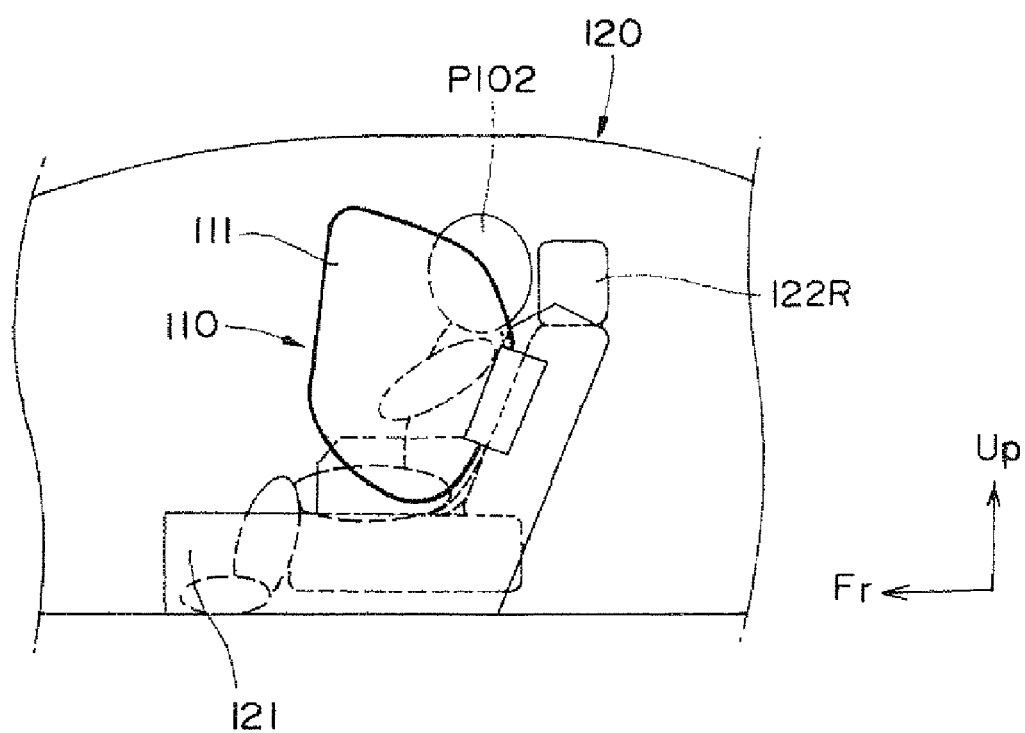
FIG. 12 illustrates the usage status of the airbag that inflates between two seats arranged to be parallel in the vehicle width direction via a center console so as to divide the seats while covering the center console.

The following section will describe the shape of the airbag 311 when the airbag 311 is inflated at the highest level (hereinafter referred to as "at inflation"). As shown in FIG. 9 and FIG. 10, the airbag 311 is structured, at the inflation thereof, to have the vertical cross-sectional outline of a trapezoidal shape in the vehicle width direction, i.e., the outline seen from the front side of the vehicle 320. In the trapezoidal shape, the upper side is wider than the lower side to be abutted to a vehicle interior ceiling 326 and the lower side is narrower than the upper side to be abutted to the upper face of the armrest 321H of the center console 321. The outline in the front-and-rear direction of the vehicle 320 has an outline having a substantially three-dimensional hexahedron shape that has a substantially rectangular shape extending in the vertical direction. FIG. 10 is a partial perspective view illustrating the airbag 311 in FIG. 9 seen from the right side.

In order to have the three-dimensional shape shown in FIG. 9 and FIG. 10 at the inflation thereof, the airbag 311 is composed, for example, of: a front cloth portion forming a front face F; a top cloth portion forming an upper face U; a bottom cloth portion forming a bottom face D; a rear cloth portion forming a back face B; and left and right side cloth portions forming left and right side faces L and R.

These front cloth portion, top cloth portion, bottom cloth portion, rear cloth portion, and left and right side cloth portions are obtained, for example, by cutting a flexible cloth sheet to have an appropriate shape to stitch the corresponding edges thereof. Then, a bag-like shape having a substantially three-dimensional and trapezoidal shape is obtained in which the top cloth portion is abutted to the vehicle interior ceiling 326 in a relatively large area and the bottom cloth portion is abutted to the upper face of the armrest 321H of the center console 321 in a relatively small area. A gas suction inlet (not shown) through which the gas from an inflator is introduced to the airbag 311 as described above is provided in the rear cloth portion of the airbag 311 for example.

At a side collision, the airbag 311 according to this embodiment is allowed to inflate between the two seats 322L and 322R arranged in the vehicle width direction from the airbag storage means 312 provided at the upper end of the center console 321 as an inflation starting point with a substantially uniform speed in the up-and-down and left and right directions. At the inflation thereof, as shown in FIG. 9, the distance Z1 from the center of the airbag storage means 312 to the vehicle interior ceiling 26 and the distance Z2 from the center of the airbag storage means 312 to the upper face of the armrest 21H of the center console 321 are set to be substantially equal to each other. Thus, the top cloth portion forming the upper end of the airbag 311 and the bottom cloth portion forming the lower end of the airbag 311 reach the vehicle interior ceiling 26 and the armrest 21H respectively substantially simultaneously. Thus, the airbag can reach more stable and restricting maximally-inflated status with a shorter time. Then, the upper portion of the airbag 311 is abutted to the vehicle interior ceiling 26 and the lower portion is abutted to the armrest 21H of the center console 321 to cause friction therewith. This can consequently restrict the move of the airbag 311 in the horizontal direction.

As shown in FIG. 10, when the airbag 311 of this embodiment is compared with a conventional airbag configured to inflate from the vehicle interior ceiling in the downward direction and a conventional airbag configured to inflate from the armrest of the center console in the upward direction, the airbag 311 of this embodiment can drastically reduce the horizontal distance H from the center of the airbag storage means to the head center or the shoulder center that must be restricted at the highest level at a side collision. The airbag 311 of this embodiment also can substantially equalize the vertical distance Z3 from the inflation center of the airbag 311 to the head center and the vertical distance Z4 from the inflation center of the airbag 311 to the shoulder center. Thus, the airbag 311 can have an improved restraint performance. Thus, at a side collision, the occupant P sitting in the seat 322R/322L at the collision opposite side can be suppressed from moving to the collision side, thereby protecting the occupant P.

The present invention can be carried out in various forms within the range not deviating from the intention. The ratio of the respective sides of the airbag is not limited to the shown example. For example, in the configuration as shown in FIG. 1 in which the airbag 10 inflates above the console 50 provided between the two seat cushions, the airbag 10 has, at the inflation thereof, the height D (see FIG. 3) set to a distance from the console 50 to the ceiling 60. When the bottom cloth portion 150 is abutted to the floor, the height D is set to a distance from the floor to the ceiling. The airbag may be shaped so that a portion shown as a corner in the drawings or description has a curved line or a curved surface.

The center console may be substituted with the center seat among the seats in three rows arranged in the vehicle width direction.

A portion in the airbag 11 abutted to the vehicle interior may be treated with a surface roughening for example in order to have a high surface friction coefficient or also may be composed of different material having a high friction coefficient from that of other portions of the airbag. A portion of the airbag 11 abutted to the vehicle interior also may be configured, in order to have an increased rigidity compared to that of other portions, by superposing two cloths for example. The airbag of the present invention is not limitedly used to inflate between seats in the first row and also can be used to inflate between seats in the second row.

What is claimed is:

1. An airbag to be inflated between two seats arranged in a vehicle width direction, the airbag comprising:
   an upper surface; and
   a bottom surface,
   wherein in an inflated state, the upper surface is wider than the bottom surface, the upper surface reaches a ceiling, and the bottom surface reaches a console provided between two seat cushions of the seats, and
   wherein the upper surface and the bottom surface have a high surface friction coefficient so as to suppress a horizontal movement of the airbag in the inflated state.

2. An airbag to be inflated between two seats arranged in a vehicle width direction, the airbag comprising:
   a front face, a back face, left and right side faces, an upper surface, and a bottom surface, wherein the front face and the back face form a shape in which an upper edge is wider than a lower edge, and in an inflated state, the upper surface reaches a ceiling and the bottom surface reaches a console provided between two seat cushions of the seats, and the upper surface and the bottom surface have a high surface friction coefficient so as to suppress a horizontal movement of the airbag in the inflated state.

3. The airbag according to claim 1 or claim 2, the upper surface and the bottom surface are treated with a surface roughening.

4. The airbag apparatus according to claim 1 or claim 2, wherein the upper surface and the bottom surface are made of material which is different from materials of other portions of the airbag.

5. The airbag according to claim 2, wherein the front face and the back face forms a trapezoidal shape in which the upper edge is wider than the lower edge.

* * * * *